United States Patent [19]
Wilke

[11] 3,834,163
[45] Sept. 10, 1974

[54] CONTROL VALVE FOR HYDRAULICALLY OPERATED IMPLEMENTS

[75] Inventor: Raud A. Wilke, Brookfield, Wis.

[73] Assignee: Koehring Company, Milwaukee, Wis.

[22] Filed: Nov. 29, 1972

[21] Appl. No.: 310,375

[52] U.S. Cl. .................................. 60/422, 91/28
[51] Int. Cl. ........................................ F15b 11/16
[58] Field of Search .................. 60/422; 91/28, 446

[56] References Cited
UNITED STATES PATENTS

| | | | |
|---|---|---|---|
| 2,608,824 | 9/1952 | Kirkham | 60/422 |
| 3,037,354 | 6/1962 | Tennis | 91/28 |
| 3,355,994 | 12/1967 | Malott | 60/422 |
| 3,465,519 | 9/1969 | McAlvay et al. | 91/446 |

Primary Examiner—Edgar W. Geoghegan
Assistant Examiner—William F. Woods
Attorney, Agent, or Firm—James E. Nilles

[57] ABSTRACT

An implement having separate pumps to supply pressure fluid to the inlet ports of a pair of hydraulic control valves, one of which governs the operation of steering control mechanism. A pair of pressure compensating valves, responsive to the pressure differential between the inlet and motor ports of the steering control valve, cooperate to maintain flow of pressure fluid to a selected motor port of the latter at a substantially constant rate. One of said compensating valves is operable to communicate the inlet port of the steering control valve with the fluid supply duct for the other control valve.

6 Claims, 4 Drawing Figures

CONTROL VALVE FOR HYDRAULICALLY OPERATED IMPLEMENTS

BACKGROUND OF THE INVENTION

This invention relates to control valves such as are used on internal combustion engine driven implements having hydraulically operated instrumentalities, and it has more particular reference to the control of hydraulic steering cylinders used in implements of the mobile type, such as front end loaders and the like.

Implements such as these are ordinarily equipped with a plurality of engine driven pumps, one of which provides a source of pressure fluid that can be directed to one end or the other of a steering cylinder on the implement at the dictate of a control valve therefor. The output of the pump, of course, varies with variations in engine speed.

Hence, steering can be accomplished in a satisfactory manner only as long as the engine is running at a fairly high speed. When the engine is operated at low or idling speeds, however, there is ordinarily insufficient pump fluid available for proper operation of the power steering mechanism. For that reason, it was heretofore customary to employ some form of demand valve by which hydraulic fluid could be diverted to the inlet of the steering control valve from one of the other pumps on the implement, to augment the output of the steering pump.

SUMMARY OF THE INVENTION

This invention obviates the need for special demand type valves in engine driven implements having power steering, through the provision of a steering control valve wherein pressure compensating valve means that can be incorporated in the valve body assures sufficient flow of hydraulic fluid to the steering cylinder for satisfactory steering despite drastic reductions in the speed at which the engine is operated.

In a specific sense, it is an object of this invention to provide a steering control valve with a pair of pressure compensating valve mechanisms which effect stabilization of pressure fluid flow to one or the other of the motor ports of the valve by regulation of the pressure at the inlet of said valve in any operating position of its control spool.

More particularly, it is a purpose of this invention to provide an open center type steering control valve with a first pressure compensating valve which restricts pump flow through the open center passage and maintains a substantially uniform inlet pressure in response to variations in the differential between inlet and motor port pressures resulting from decrease in inlet port pressure throughout a first range of pressures, and wherein a second pressure compensating valve which is also responsive to the differential between inlet and motor port pressures becomes operative upon further decrease in inlet port pressure to divert pressure fluid thereto from a second passage in the control valve from which another hydraulic instrumentality is supplied with pressure fluid from a different pump.

In this respect, it is a purpose of the invention to accomplish the objectives set forth in the preceding two paragraphs by means of a steering control valve having a passage in its body to supply pressure fluid to a second control valve on the implement from a pump other than the steering pump, and which supply passage has a branch communicable with the inlet of the steering control valve under the control of one of said pressure compensating valve mechanisms. Accordingly, the flow of pressure fluid to the inlet port of the steering control valve, from its pump, can be augmented by pressure fluid diverted to the inlet thereof from another pump via said branch passage in the body of the steering control valve.

DESCRIPTION OF THE PREFERRED EMBODIMENT

Figure 2:
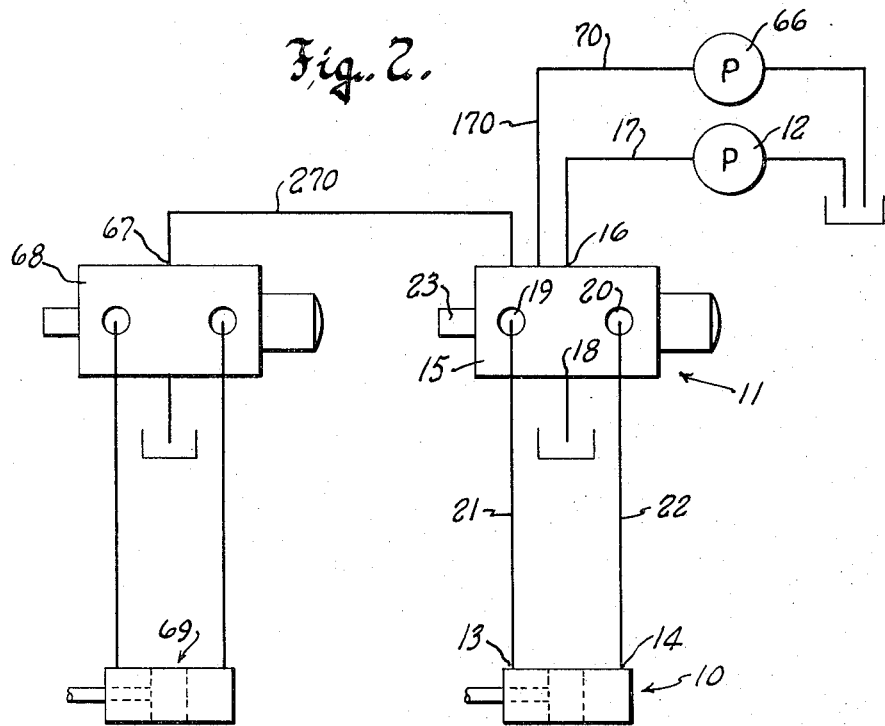
FIG. 2 is a diagrammatic view of two hydraulic systems on the loader, one of which comprises the power steering system thereof.

Referring now to the accompanying drawings, the numeral 5 generally designates an implement having a prime mover in the form of an internal combustion engine 6, and sets of front and rear wheels 7 and 8, respectively. The implement is provided with power steering mechanism, not shown; and the operation of the power steering mechanism is effected by means comprising a double acting steering cylinder 10 (FIG. 2) and a control valve 11 to direct pressure fluid from an engine driven steering pump 12 to one or the other of a pair of cylinder ports 13, 14 at the opposite ends of the cylinder.

The steering valve 11 has a body 15 with an inlet port 16 connected to the output port of the pump 12 by means of a supply duct 17; an outlet or reservoir port 18; and a pair of motor ports 19 and 20 connecting with the cylinder ports 13 and 14 by service lines 21 and 22, respectively.

Figure 3:
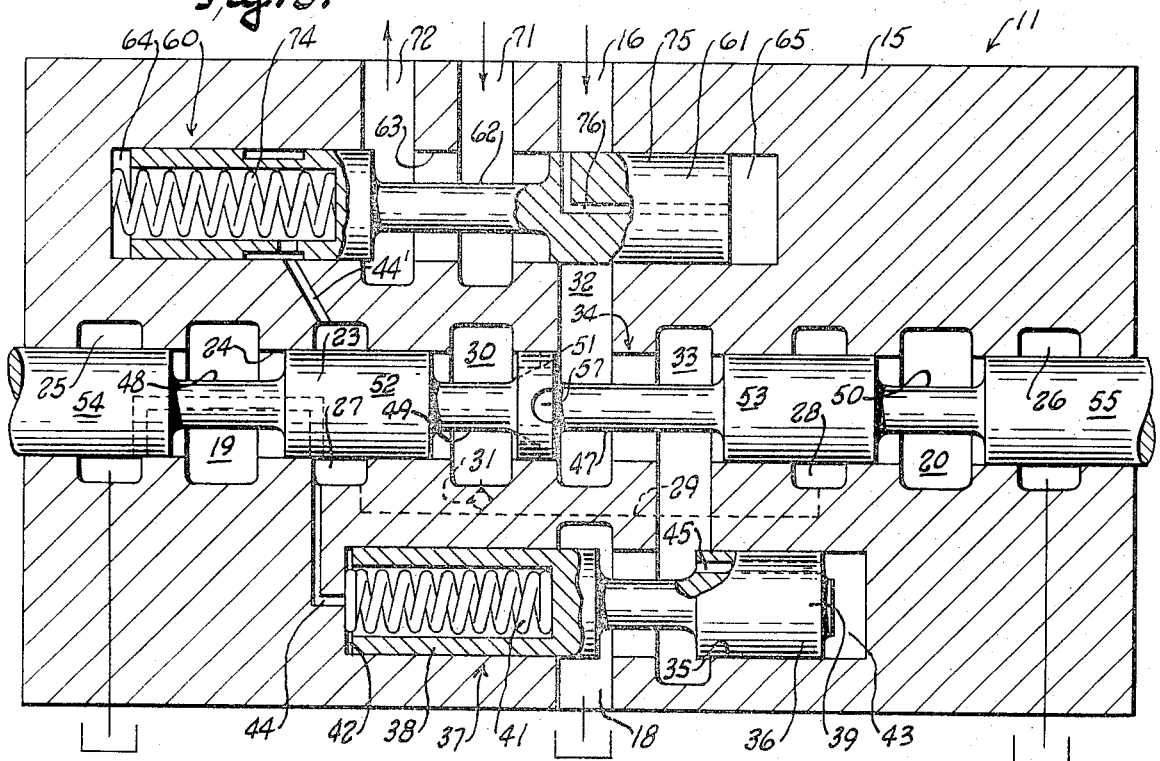
FIG. 3 is a more or less diagrammatic view of the steering control valve of this invention, with the spool thereof in its neutral position.

The steering valve is of the open center type having a spool 23 slidable endwise in a bore 24 in the body from a neutral or hold position shown in FIG. 3, in which it is yieldingly held by the usual centering spring assembly, to a pair of operating positions at opposite sides of neutral to selectively communicate either motor port 19 or 20 with the inlet port and the nonselected motor port with an exhaust outlet. In the steering control valve shown, nine passages open to the bore 24 at axially spaced locations therealong. Of these, the two outermost passages 25 and 26 comprise exhaust outlets; two motor ports 19 and 20 open to the bore at locations axially inwardly from the exhaust outlets; two legs 27 and 28 of a feeder bridge open to the bore at zones axially inwardly of the motor ports, and are connected by a bight portion 29; a pressure well 30 opens to the bore at a location axially inwardly of the bridge leg 27 and is communicated with the bight 29 of the feeder bridge through a check valve 31; and the inlet and outlet branches 32 and 33 of the open center passage 34 open to the bore at axially spaced zones between the pressure well 30 and the right hand leg 28 of the feeder bridge.

The inlet or upstream branch 32 of the open center passage, of course, communicates with the inlet port 16. The outlet or downstream branch 33 of the open center passage communicates with the outlet port 18 through a bore 35 at the downstream side of the valve spool 23, under the control of a center grooved plunger 36 in said bore. The plunger comprises the major component of a first pressure compensating valve 37.

Figure 4:
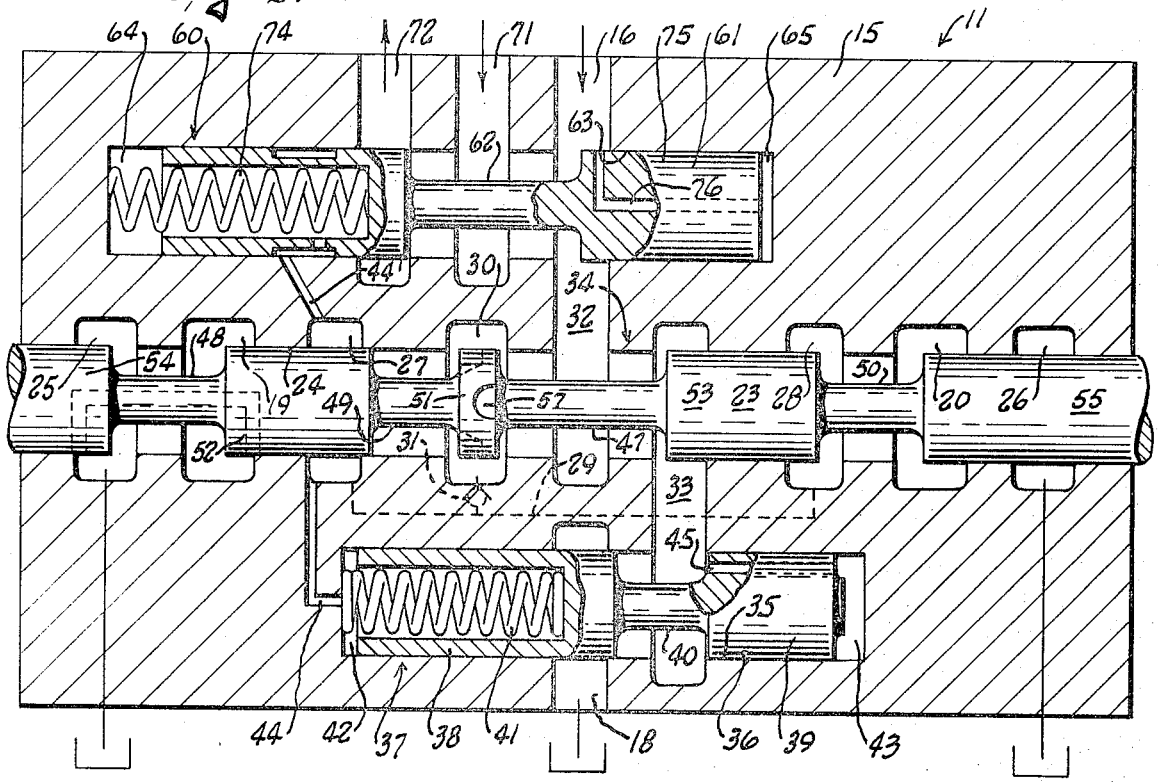
FIG. 4 is a view similar to FIG. 3 but showing the valve spool in an operating position metering the flow of fluid to the steering cylinder.

The downstream branch 33 of the open center passage and the outlet port 18 open to axially spaced zones of the bore 35, and communication therebetween is controlled by the left hand land 38 on the plunger 36. The land 38 and a second land 39 on the right hand end of the plunger are defined by the circumferential center groove 40 therein. A spring 41 acting upon the left hand end of the plunger yieldingly urges the same toward a position at which its land 38 closes off the outlet port from the downstream branch of the open center passage (FIG. 4).

The bore 35 for the plunger of the pressure compensating valve 37 is closed to define pressure chambers 42 and 43 into which the lands on the plunger project to act as pistons therein. The chamber 42 at the left hand end of the plunger is communicated by a feedback passageway 44 with the left hand leg 27 of the feeder bridge, while the other chamber 43 is communicated with the downstream branch 33 of the open center passage by means of an axial passage 45 in the plunger land 39.

Output fluid from the pump 12 can enter the inlet port 16 of the steering control valve and flow from the upstream branch 32 of the open center passage 34 to its downstream branch 33 through the bore 24 and a circumferential groove 47 in the valve spool 23, in the neutral position thereof seen in FIG. 3. The pressure fluid thus introduced into the outlet branch 33 of the open center passage can flow through the axial passage 45 in the land 39 of the compensating plunger 36 and into the pressure chamber 43 behind it. Such pressure fluid in chamber 43 exerts force on the plunger counter to the force of the spring 41 and causes the plunger to shift to the left to an open or pump unloading position communicating the downstream branch 33 of the open center passage with the outlet port 18, to thus communicate the latter with the inlet port 16.

In addition to its groove 47, the control spool has three other circumferential grooves 48, 49 and 50. These grooves cooperate to define a central land 51, lands 52 and 53 to the left and right thereof, respectively, and end lands 54 and 55 at the outer end portions of the spool. The lands 54 and 55 normally block communication between the motor ports 19, 20 and their adjacent exhaust passages 25, 26; the lands 52 and 53 normally block communication between the motor ports and the legs 27, 28 of the feeder bridge; and the center land 51 normally blocks communication between the upstream branch 32 of the open center passage and the feeder well 30. The center land has here been shown as having metering notches 57 in its opposite faces.

The pressure compensating valve 37 operates in a more or less conventional manner to regulate the pressure in the inlet portion of the open center passage in accordance with variations in the pressure differential across the orifice at the notched center land 51 in any metering position of the valve spool 23. In other words, this differential can be said to be that which exists between the inlet branch 32 of the open center passage, and either motor port 19 or 20 as detected at the pressure well 30. Consequently if the pressure differential between the inlet port 16 and the pressure well 30 can be maintained at a uniform value, pressure fluid will flow to the selected motor port at a constant rate.

For example, if the valve spool 23 is shifted to a partial operating position to the left of neutral (see FIG. 4) to direct a desired metered amount of pressure fluid from the inlet port 16 to the pressure well 30 for flow through the right hand feeder bridge leg 28 to the motor port 20, the pressure of fluid in the inlet branch 32 of the open center passage will be imposed upon the right hand end of the compensating plunger 37 and the pressure of fluid at the motor port 20, sensed at the feeder bridge through passageway 44, will be imposed upon the left hand end of the plunger so that the latter can be said to be sensitive to the pressure drop across the orifice at the notched center land 51.

If the pressure in the inlet branch 32 then decreases for any reason, as it will upon deceleration of the engine driving the pump 12, the pressure will drop accordingly in the pressure chamber 43 of the compensating valve. When that occurs, the compensating plunger 36 will move to the right, to a position such as shown in FIG. 4, to close off communication between the open center passage and the outlet 18 and cause the pressure to build up at the inlet 16 to the value at which the desired pressure drop exists across the orifice at the notched center land 51 of the spool; and pressure fluid will resume flow to the motor port 20 and the steering cylinder at a rate corresponding to the metering setting of the valve spool 23.

If the pressure of fluid in the inlet branch 32 of the open center passage should increase, however, the resulting variation in the pressure drop across the orifice at the notched center land 51, through which inlet fluid flows to the motor port, will cause the compensating plunger to move to the left, in the direction to increase the degree of communication between the outlet 18 and the open center passage 34 and thus reduce the pressure at the inlet by an amount such as to restore the pressure drop across the aforesaid orifice which prevails when pressure fluid flows to the steering cylinder at the desired rate.

There will be times, however, that the compensating valve mechanism 37 will be unable to effect the desired increase in fluid flow to the steering cylinder in response to variation in pressure drop across the orifice at the notched land 51 resulting from substantial decrease in pressure at the inlet 16 due to deceleration of the engine 6 to low or idling speeds. This is to say that even though the compensating plunger 36 will act at such a time to completely close off the outlet 18 from the downstream branch 33 of the open center passage, the pump will be incapable of supplying enough pressure fluid for operation of the steering cylinder in the desired manner under the control of the valve spool 23.

According to this invention, a second pressure compensating valve mechanism 60 is provided for cooperation with the compensating valve 37 in minimizing variations in the rate of flow to the steering cylinder, even at low engine or idling speeds. The compensating valve mechanism 60 also has a pressure responsive plunger 61 with a center groove 62, and it operates in a bore 63 having pressure chambers 64 and 65 at the left and right hand ends of the plunger. The bore 63 intersects the inlet branch 32 of the open center passage, and is located upstream from the valve spool 23. The plunger 61, however, never interferes with fluid flow through the inlet branch of the open center passage.

Figure 1:
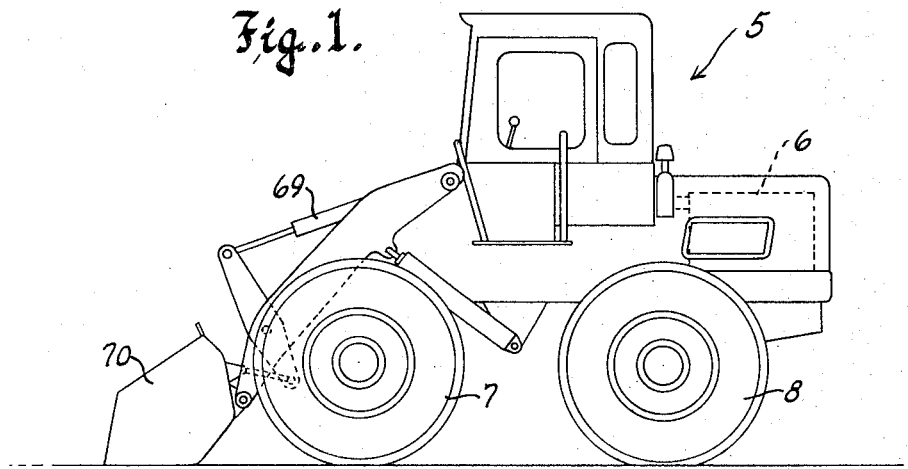
FIG. 1 is a side elevational view of an internal combustion driven front end loader, having power steering means.

The plunger 61 controls fluid flow from a second pump 66 to the inlet 67 of the control valve 68 governing the cylinder 69 for some other hydraulically operated mechanism on the implement. Merely by way of example, the cylinder 69 can be that which operates the bucket 70 on the front end loader illustrated in FIG. 1.

The output port of the pump 66 is communicated with the inlet of the bucket control valve 68 through a supply line 70 a portion of which is comprised of inlet and outlet branches 71 and 72, respectively, in the body of the steering control valve 11. The inlet branch 71 is communicated with the pump 66 by a duct 170, and the outlet branch 72 is communicated with the inlet 67 of the bucket control valve through a duct 270.

The two branches 71 and 72 of the supply line 70 intersect the bore 63 in which the plunger 61 operates, at axially spaced zones of said bore. They are communicable with one another through the bore and the groove 62 in the plunger 61. It will be noted, however, that the inlet branch 71 is located adjacent to the inlet port 16, between the latter and the outlet branch 72.

A spring 74 yieldingly urges the plunger 61 to the right, but during normal operation of the steering pump 12, the plunger is held in the position seen in FIG. 3, at which the land 75 on its right hand end closes off communication between ports 71 and 16, and its center groove 62 affords full communication between the inlet and outlet branches 71 and 72 of the supply line for the bucket control valve. The plunger 61 is held in this normal position under force exerted on its right hand end by pressure fluid from the steering control pump 12 in chamber 65, which chamber is communicated with the inlet port 16 through a passageway 76 in the land 75.

The chamber 64 in the left hand end of the bore 63 is also communicated with the leg 27 of the feeder bridge by a duct 44' so as to be pressurized by pump fluid flowing to the steering cylinder in either operating position of the steering valve spool 23. Thus, the plunger 61 of the upstream pressure compensating valve 60 is also sensitive to and actuated in accordance with variations in the pressure differential across the orifice through which pressure fluid passes from the inlet branch 32 of the open center passage 34 to the pressure well 30, on its way to the feeder bridge and either motor port then in communication therewith.

It should be noted that the valve spool 23 is provided with a passageway 80, the ends of which open through the peripheries of lands 52 and 54 at locations to communicate the bridge leg 27 with the exhaust passage 25 in the neutral position of the valve spool. Accordingly, the spring chambers of the two pressure compensating valve mechanisms 37 and 60 are vented in the neutral position of the valve spool 23. However, the venting passageway 80 is rendered ineffective upon only slight movement of the spool in either direction out of its neutral position.

OPERATION

With the engine 6 running at normal speed, and as long as the valve spool 23 remains in its neutral position seen in FIG. 3, output fluid from the steering pump 12 will hold the plunger of valve 60 in its left hand or normal position, and its entire output will flow through the open center passage and actuate the plunger of the downstream pressure compensating valve 37 to its open position to unload the pump through the outlet port 18.

When the operator either manually, or by pilot control, effects motion of the spool 23 of the steering control valve to a partial operating position to the left of neutral, a metered amount of output fluid from the steering pump 12 will be diverted to motor port 20 and the excess will flow restrictedly past the plunger of the downstream compensating valve 37 to the outlet port 18, via the downstream branch 33 of the open center passage 34. The steering control cylinder will thus be actuated in one direction, at a speed corresponding to the metering setting of the valve spool 23.

If the engine 6 on the implement is then throttled down, the resulting change in the pressure drop across the orifice at the notched center land 51 resulting from decrease in the pressure at the inlet port 16, will immediately cause the plunger of the downstream pressure compensating valve 37 to be shifted by its spring 41 in the direction to restrict flow of bypass fluid to the outlet port 18 an extent such as will raise inlet pressure to the value at which the desired pressure drop is restored and the steering cylinder operates at the speed corresponding to the setting of the steering control spool 23. If the pressure drop across the orifice at the notched center land 51 changed drastically enough, for example because of decrease in inlet pressure to about 40 psi because of deceleration of the engine 6 to idling speed, the spring 41 acting on the compensating plunger of valve 37 will cause the plunger to move to a position completely closing off the downstream branch 33 of the open center passage from the outlet port 18, to thereby constrain all of the fluid discharging from pump 12 to flow to the motor port 20.

If the desired pressure drop across the orifice at the notched center land 51 is not then restored as a consequence of such closure of the outlet end of the open center passage 34, and the pressure of fluid in the inlet branch 32 of the open center passage remains at about the 40 psi value given by way of illustration, the fluid pressure in the chamber 65 of the upstream pressure compensating valve 60 will reflect this low pressure condition at the inlet port 16 with the result that the spring 74 will shift the plunger 61 to the right, to decrease flow of fluid from the bucket pump 66 to the outlet branch 72 of the supply line 70 and at the same time effect diversion of fluid from pump 66 to the inlet port 16 of the steering control valve via the passage 71 and the center groove 62 in plunger 61. This condition is depicted in FIG. 4.

Such action of the plunger of pressure compensating valve 60 will either restore the desired pressure in the inlet branch 32 of the open center passage, or at least raise the pressure therein sufficiently to closely approach the desired pressure drop across the orifice at the notched center land 51 which is present when fluid flows to the steering cylinder at a rate corresponding to the metering setting of the steering valve spool 23.

If the engine 6 is running at low or idling speed at the time the steering valve spool is actuated in the manner described, either the downstream pressure compensating valve, or both, will operate as set forth above to minimize loss of pressure in the inlet branch 32 of the open center passage 32, and keep up flow of pressure fluid to the steering cylinder.

In the event the plunger in the downstream pressure compensating valve becomes stuck in an open position at which it communicates the outlet port 18 and the downstream branch 33 of the open center passage, there would ordinarily be insufficient pressure available for operation of the steering cylinder. According to the present invention, however, the steering control spool is designed with a long stroke so as to be able to overcome such malfunctioning of the pressure compensating valve 37 upon being actuated to an extreme operating position at either side of its neutral position.

In one such operating position, reached upon stroking of the valve spool farther to the left from its position seen in FIG. 4, the land 53 on the spool will enter that portion of the bore 24 between the upstream and downstream branches of the open center passage 34 and completely close off bypass flow through the latter. This, of course, compels all of the pump fluid entering the upstream branch 32 of the open center passage to flow to motor port 20, for operation of the steering cylinder.

Similarly, all the pump fluid entering the inlet port will be compelled to flow to motor port 19 when the valve spool is shifted to an extreme right hand position at which the land 51 is centered in that portion of bore 24 located between the two branches of the open center passage.

On the other hand, if the plunger 61 in the upstream pressure compensating valve should become stuck in a right hand position at which all three passages 16, 71 and 72 are in communication with one another, pressure fluid from the steering pump could conceivably flow through the bore 63 and outlet branch 72 of the supply line 70 to the inlet port 67 of the bucket control valve 68. Hence, there would be no power available for steering at such a time, if the valve spool in the bucket control valve was in a pump unloading neutral position. In that case, the operator of the implement can easily restore pressure at the inlet port 16 of the steering control valve by merely actuating the valve spool of the bucket control valve 68 to an operating position closing off the open center passage therein.

It is also noteworthy to observe that if the bucket control valve is in neutral at the time pressure drops off in the inlet port 16 of the steering control valve, the plunger in the upstream pressure compensating valve 60 will be caused to move to the right under the force of its spring 74, and metering of fluid flow from the bucket pump to the bucket control valve will take place at the land face of plunger 61 at the left hand end of the center groove 62 in the plunger.

If the bucket is operating and there is pressure in the inlet and outlet branches 71 and 72 at the time pressure drops off in the inlet port 16 of the steering control valve, the plunger 61 will also be moved to the right by its spring, and metering of flow from the bucket pump to the inlet port 16 of the steering control valve via branch passage 71 will take place at the land face of plunger 61 at the right hand end of its center groove 62.

In both of these last two examples, the metering that takes place at either end of the center groove in plunger 61 is for the purpose of maintaining the flow needed in the steering system.

From the foregoing description, together with the accompanying drawings, it will be apparent to those skilled in the art that this invention provides a simple but practical solution to the problem of maintaining fluid flow to the steering cylinder of a mobile engine driven implement; and is further valuable because it takes into account the possibility of malfunction of the pressure compensating valve mechanisms therein and provides safeguards to assure steering even though those valve mechanisms become inoperative for any reason.

Those skilled in the art will appreciate that the invention can be embodied in forms other than as herein disclosed for purposes of illustration.

The invention is defined by the following claims:

1. In combination with a pair of pump and control valve assemblies, wherein one of said control valves is of the open center type and each has a pump connected inlet port and a valve spool movable to an operating position to effect flow of pressure fluid from said inlet port to a motor port thereof:
    A. duct means through which the inlet port of said one control valve is connectable with the pump connected inlet port of the other control valve;
    B. and two pressure compensating valve mechanisms, each movable in one direction in consequence of decrease in the pressure of fluid in the inlet port of said one control valve,
        1. one of said pressure compensating valve mechanisms being operable upon such movement to restrict fluid flow out of said open center passage in consequence of decrease in pressure in the inlet portion thereof throughout a first range of pressures,
        2. and the other of said pressure compensating valve mechanisms being operable upon such movement thereof to effect diversion of pressure fluid through said duct means to the inlet port of said one control valve in consequence of further decrease in the pressure of fluid therein.

2. In combination with a mobile implement having a separate hydraulic cylinder for each of two implement carried mechanisms one of which mechanisms comprises steering means:
    A. a pump for each of said cylinders;
    B. a pair of control valves, one for each cylinder, each control valve having cylinder and pump connected ports, an open center passage leading from the pump connected port, and a spool movable to an operating position to effect flow of pressure fluid from its open center passage to its cylinder port;
    C. duct means through which the pump port of the steering control valve is connectable with the pump associated with the other control valve;
    D. and two pressure compensating valve mechanisms, each sensitive to the pressure in the pump connected port in the steering control valve,
        1. means for rendering one of said valve mechanisms operable upon decrease in the pressure at the inlet port of the steering control valve throughout a predetermined range of substantially low pressures to effect metering restriction of discharge flow through the open center passage of said steering control valve;

2. and means for rendering the other of said valve mechanisms operable to effect diversion of pressure fluid through said duct means to the inlet port of the steering control valve in consequence of further decrease in the pressure of fluid at said inlet port.

3. In combination:
A. a control valve having
   1. first and second pressure fluid supply passages, inlet portions of which are connectable with separate pressure fluid sources, and having separate outlet portions,
   2. a motor port,
   3. and a valve spool movable to an operating position across said first passage to divert pressure fluid from the inlet portion thereof to said motor port;
B. means providing a passageway communicating the inlet portions of said passages;
C. and first and second pressure compensating valve mechanisms each having a valve member movable in one direction in consequence of pressure drop in said first passage an extent dependent upon the magnitude of said pressure drop,
   1. such movement of the valve member of said first valve mechanism effecting reduction in fluid flow through the outlet portion of said one passage so as to thereby effect increase in the pressure of fluid in the inlet portion thereof,
   2. and the valve member of said second valve mechanism normally closing said communicating passageway but being operable upon such movement thereof in said one direction to restrict communication between the inlet and outlet portions of said second passage and at the same time effect communication of the inlet portion thereof with the inlet portion of said first passage via said communicating passageway.

4. In combination:
A. a directional control valve having a body with a bore, an inlet to receive pressure fluid from a first source, an inlet passage connecting the inlet with the bore, a service port for a first fluid motor, and a valve spool which is slidable in the bore from a neutral position to a working position effecting diversion of said source fluid from the inlet passage to the service port;
B. means defining a pressure fluid supply line through which pressure fluid from another source thereof can flow to a second fluid motor;
C. branch passage means in said body connecting said supply line with said inlet passage;
D. a fluid pressure responsive valve mechanism which is operable in said working position of the valve spool to regulate communication between said branch passage means and the inlet passage in accordance with variations in the pressure differential between inlet passage and service port pressures;
E. a spring exerting force on said valve mechanism to urge the same in one direction toward an open position at which it permits pressure fluid flow from the branch passage means to the inlet passage for diversion to the service port along with pressure fluid entering the inlet passage from the first pressure fluid source in said working position of the valve spool;
F. and means for translating increase in inlet passage pressure into movement of said valve mechanism in the opposite direction so as to effect restriction of communication between the branch passage means and the inlet passage to an extent depending upon the magnitude of the pressure of fluid in the inlet passage.

5. In combination:
A. a control valve having
   1. a pair of pressure fluid passages having inlet portions that are connectable with separate pressure fluid sources and with one another, said passages having separate outlets,
   2. a motor port,
   3. and a valve spool movable to a working position across one of said passages and at all times operable to divert fluid therefrom to said motor port;
B. and fluid pressure actuatable valve means for each of said passages, operable in consequence of decrease in the pressure of fluid in said one passage to effect reduction in fluid flow out of the outlets of each of said passages and to at the same time effect communication between the inlet portions thereof.

6. In combination:
A. two hydraulic systems each comprising a cylinder, a pump, and a control valve having cylinder and pump connected ports and a spool movable to a working position to effect flow of pressure fluid from the pump connected port to the cylinder port;
B. means in one of said control valves providing first and second passageways, through the first of which pressure fluid must flow to reach the pump connected port of the other control valve, said first passageway having a branch passage leading to the pump connected port of said one control valve, and said second passageway normally providing for flow to an outlet port of all of the fluid entering the pump connected port of said one control valve;
C. a first pressure compensating valve mechanism for said one control valve operable in said working position of its spool to increasingly restrict flow to said outlet port in response to decreasing pressure in the pump connected port of said one control valve throughout a first range of pressures;
D. and a second pressure compensating valve mechanism controlling said branch passage and operable to effect increasing flow of pressure fluid therethrough to the pump connected port of said one control valve in response to decreasing pressure of fluid in said last named port throughout a second range of pressures lower than those of said first range of pressures.

* * * * *